United States Patent [19]
Andrick

[11] Patent Number: 4,602,793
[45] Date of Patent: Jul. 29, 1986

[54] GASKET WITH ENCAPSULATED LOCKING RING

[75] Inventor: William C. Andrick, Uniontown, Ohio

[73] Assignee: Polymer/Raymond Industries, Middlefield, Ohio

[21] Appl. No.: 659,083

[22] Filed: Oct. 9, 1984

[51] Int. Cl.[4] .......................... F16J 15/12; F16L 17/02
[52] U.S. Cl. .................. 277/207 A; 277/152; 285/110; 285/345; 285/379
[58] Field of Search ............... 277/152, 153, 166, 205, 277/206 R, 207 R, 207 A, 207 B, 212 R, 212 C, DIG. 2; 285/110–113, 230–232, 345, 379

[56] References Cited

U.S. PATENT DOCUMENTS

| | | | |
|---|---|---|---|
| 1,608,470 | 11/1926 | Ferguson | 277/230 |
| 3,185,490 | 5/1965 | Gagne | 277/207 A X |
| 3,776,682 | 12/1973 | Parmann | 425/384 |
| 4,182,519 | 1/1980 | Wilson | 277/207 A |
| 4,230,157 | 10/1980 | Larsen et al. | 285/345 X |
| 4,299,412 | 11/1981 | Parmann | 285/110 |
| 4,343,480 | 8/1982 | Vassallo | 277/207 A |
| 4,362,323 | 12/1982 | Lodder et al. | 285/379 X |
| 4,379,559 | 4/1983 | Bohmann | 285/345 X |
| 4,426,095 | 1/1984 | Buttner | 277/207 A |
| 4,487,421 | 12/1984 | Housas et al. | 277/207 R X |

FOREIGN PATENT DOCUMENTS

| | | | |
|---|---|---|---|
| 1118551 | 11/1961 | Fed. Rep. of Germany . | |
| 1617/70 | 4/1970 | Norway . | |
| 133818 | 3/1976 | Norway . | |
| 7802712-5 | 10/1979 | Sweden | 285/110 |
| 890775 | 3/1962 | United Kingdom | 277/207 A |
| 1033756 | 6/1966 | United Kingdom . | |
| 2084669 | 4/1982 | United Kingdom | 277/207 A |

*Primary Examiner*—Robert S. Ward
*Attorney, Agent, or Firm*—Fay, Sharpe, Fagan, Minnich & McKee

[57] ABSTRACT

A gasket assembly suitable for sealing between two pipe members in a high pressure pipeline includes an annular gasket body made of a resilient material. The body terminates radially inwardly in a leading lip and a pressure actuated sealing lip. The leading lip has a pipe centering and cleaning face and a compression sealing face. An enclosed annular groove is provided in the gasket body with an annular retaining ring being provided in the groove. The ring is made of a material harder than the gasket body and functions to retain the gasket body in the pipe groove.

12 Claims, 5 Drawing Figures

GASKET WITH ENCAPSULATED LOCKING RING

BACKGROUND OF THE INVENTION

This invention generally pertains to gasket assemblies or sealing assemblies. More specifically, the present invention relates to a gasket assembly having an encapsulated locking ring.

The invention is particularly applicable to gasket assemblies suitable for insertion into a groove formed in a bell end of an associated pipe to form a bell and spigot joint. However, it will be appreciated by those skilled in the art that the invention has broader application and may also be adapted for use in many other sealing environments in which one member is inserted in a fluid tight manner into another member.

Pipes are used for the conveyance of water (or other fluids) under pressure, as in penstocks, inverted siphons, and city water lines. They may also be used as free-flow conduits running partly full, as in drains and sewers. Pipes for conveying water in appreciable quantities have been made of steel, cast iron, concrete, vitrified clay, and, most recently, plastic.

It is presently the usual practice to extrude plastic pipes in elongated, cylindrical configurations having a desired diameter and then to cut the extruded product into lengths of a convenient size suitable for handling, shipping and installing. Such sizes may be, for example, ten or twenty foot lengths. Each length of pipe is then enlarged or "belled" at one end sufficiently to join the next adjacent pipe section by receiving in the belled end the unenlarged or "spigot" end of an adjacent length of pipe. The inside diameter of the bell is formed sufficiently large to receive the spigot end of the next section of pipe with sufficient clearance to allow the application of packing, caulking, gaskets or other devices designed to prevent leakage at the pipe joints when a plurality of pipe lengths are joined to form a pipeline. Depending upon the intended pressure of the fluid being conveyed, as well as other design parameters, the seals between adjacent lengths of pipe will be required to be more or less sophisticated.

The pressures a conventional pipeline, and hence the gasket, are exposed to vary from 0 to 250 psi. The American Water Works Association (AWWA) has set the following standards for pipelines: CIPS or high pressure pipe, such as used for fire hydrants and water mains, must withstand 250 psi; IPS or pressurized pipe, such as regular water supply lines, must withstand 160 psi; PIP or plastic irrigation pipe must withstand 50 psi and sewer pipe must withstand 20 psi. As might be expected, gaskets for the CIPS-type pipelines are the most difficult to design. For example, a gasket in a fire hydrant pipeline is under high pressure until the hydrant is opened, at which point the pressure drops precipitously and a vacuum may be formed in the pipeline. The gasket must not only prevent the pressurized water from leaking out at the joints of the pipeline, but must also prevent the entry of air or other infiltrates when a vacuum is pulled on the pipeline.

Prior workers in the art, particularly in the plastic pipe industry, have developed various gaskets which are adapted to be retained within an inwardly facing groove formed in the bell. These gaskets were configured to permit the pipe joint to be quickly made and were intended to be leak proof. While experience has proven that the use of a formed gasket seated within a pipe bell annular groove is an efficient and suitable construction for sealing pipe joints between adjacent lengths of pipes, difficulties have been encountered in maintaining the seal under both high pressure and vacuum conditions. As operating pressures have increased, the difficulties encountered in providing efficient and reliable seals have also increased.

In an effort to solve the sealing problems in high pressure piping systems, prior workers in the art have developed gaskets of the type including extending lips which press against the spigot end. Additionally, other workers have provided gaskets having an inwardly facing peripheral groove within which is seated a locking ring designed to prevent movement of the seal and to discourage gasket blow-out when system pressure or vacuum is applied. Since these locking rings were not centered in the gasket bodies, however, the gaskets were still prone to blow-out.

In a further effort to prevent unseating of the gasket when the pipe joint was made or to prevent blow-out under severe conditions of use, efforts have been made to lock the gasket within the annular groove in the bell. Such efforts by prior workers in the art have included machining the groove to an annular configuration to seat the gasket in the groove. Others have attempted to lock the gasket in the groove by applying, either by a threaded connection or by an adhesive juncture, an outer locking ring or retainer of smaller diameter than the gasket itself. Such prior art attempts to retain the gasket within the groove have, however, not proven to be entirely successful because the end results have not justified the associated increase in gasket complexity and manufacturing costs.

Accordingly, it has been considered desirable to develop a new and improved gasket assembly which would overcome the foregoing difficulties and others while providing better and more advantageous overall results.

BRIEF SUMMARY OF THE INVENTION

In accordance with the present invention, a new and improved gasket assembly suitable for sealing between two pipe members in a high pressure pipeline is provided.

More particularly in accordance with the invention, the gasket assembly includes an annular gasket body made of a resilient material with the body terminating radialy inwardly in a leading lip and a pressure actuated sealing lip spaced rearwardly therefrom. The leading lip has a pipe centering and cleaning face and a compression sealing face. An annular groove is provided in a central portion of the gasket body with the groove being enclosed by the body. An annular ring is provided in the gasket body annular groove with the ring being made of a material harder than the gasket body.

In accordance with another aspect of the invention, the groove is rectangular in cross section, and the ring is also rectangular in cross section.

According to another aspect of the invention, the gasket assembly further includes an annular opening leading from an exterior periphery of the gasket body to the groove to allow for selective insertion and removal of the annular ring. Preferably, the opening leads from a rear face of the gasket body to the groove. The opening is closed when the gasket is positioned in a groove or bell of an associated pipe.

According to a further aspect of the invention, the gasket body terminates radially outwardly in a generally convex outer face.

In accordance with a still further aspect of the invention, the annular groove is centrally located between the leading lip and the pressure actuated sealing lip such that the groove is centered in the gasket body.

In accordance with a yet further aspect of the invention, the pressure actuated sealing lip extends further radially inwardly than does the leading lip.

According to a yet further aspect of the invention, the leading lip pipe centering and cleaning face is conically shaped and is located forwardly and radially outwardly of the compression sealing face.

The principal advantage of the present invention is the provision of a new and improved gasket assembly which will provide a fluid tight seal between two members such as, for example, two lengths of pipe even under high pressures and vacuums.

Another advantage of the invention is the provision of a gasket assembly in which a locking ring is firmly retained in a groove in the gasket and does not have a tendency to twist out of the gasket even under high pressure conditions.

A further advantage of the invention is the provision of a leading lip which has a first face serving a pipe centering and cleaning function as well as a second face serving a compression sealing function.

A still further advantage of the invention is the provision of a gasket assembly in which the locking ring is encapsulated in the gasket to prevent abrasives or chemicals from harming the locking ring.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
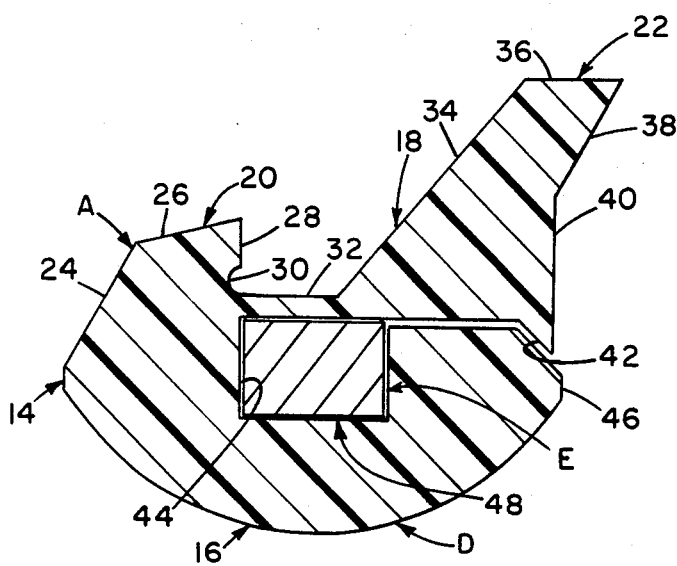
FIG. 1 is a cross-sectional view through the subject new gasket assembly.
Figure 2:
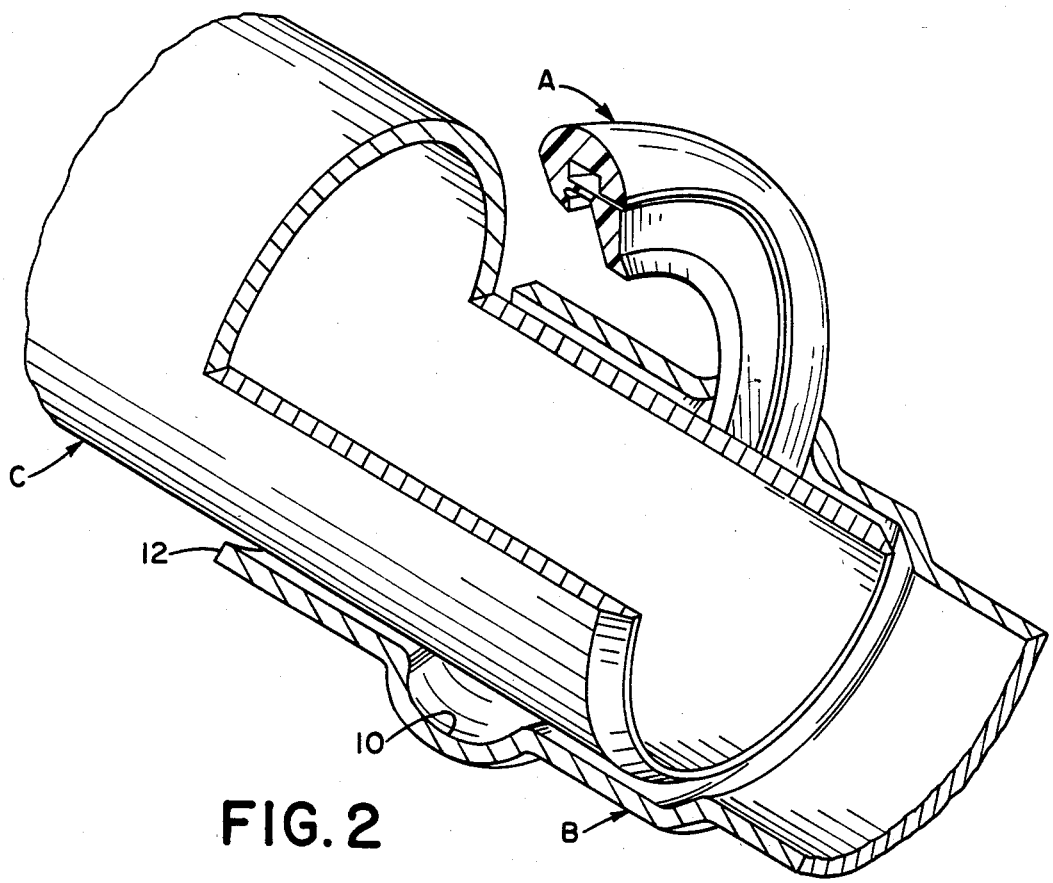
FIG. 2 is a reduced scale perspective view of the gasket assembly of FIG. 1 in use in a bell and spigot pipe joint; and, FIGS. 3A through 3C are longitudinal cross-sectional views which show the process of insertion of a first pipe into a second pipe to form the bell and spigot pipe joint of FIG. 2.

Referring now to the drawings, wherein the showings are for purposes of illustrating a preferred embodiment of the invention only and not for purposes of limiting same, FIG. 1 shows the subject new gasket assembly A in use in a pipe joint. More specifically, and with reference to FIG. 2, the gasket assembly A is provided in a pipe groove 10 of a first pipe B and seals against a second pipe C which is inserted through a pipe opening 12 of the first pipe B. While the gasket assembly A is primarily designed for and will hereinafter be described in connection with a bell and spigot joint used for pipes in high pressure pipelines which need to withstand pressures of up to 250 psi, it will be appreciated that the overall inventive concept could be adapted for use in many other sealing environments as well.

With reference again to FIG. 1, the gasket assembly includes a gasket D having a gasket body 14 which has an arc-shaped outer face 16, as well as an inner face 18 provided with a leading lip 20 and a pressure actuated sealing lip 22. The leading lip 20 includes a forward face 24 which is used as a centering and cleaning face for the second pipe C. The leading lip also includes a top face 26 located rearwardly and radially inwardly of the forward face 24 as well as a back face 28. The top face 26 provides a compression sealing face against the second pipe C. Both the forward face 24 and the top face 26 are preferably conically shaped.

An indented portion 30 is provided at a boundary between the back face 28 and a radially outwardly located flat portion 32 of the inner face 18. Such indented portion 30 enhances the ability of the leading lip 20 to be bent back against the gasket body 14 as shown in FIGS. 3B and 3C. The pressure actuated sealing lip 22 includes a forward face 34, a top face 36, as well as an inclined rear face 38 and a straight rear face 40.

An annular opening 42 is provided in the straight rear face 40 and leads to a groove 44 in the interior of the gasket body 14. The groove 44 is provided on the symmetrical center line of the gasket D and is situated deep in the body of the gasket to center a locking ring E in the gasket. An offset straight portion 46 is provided on the other side of the groove 42 and leads to the arc-shaped outer face 16.

The locking ring E has a ring body 48 and is positioned within the groove 44 to retain the two lips 20, 22 in sealing engagement with the outer periphery of the second pipe C. The ring body 48 is illustrated as being rectangular in shape and as being housed in a rectangular groove, although it is evident that rings having other geometric shapes could also be accommodated in suitably shaped grooves in the gasket D. It has, however, been found that a rectangularly shaped locking ring provides advantages in the retention of the locking ring E in the gasket D since it prevents a twist-out of the locking ring from the gasket even under high pressure conditions. The encapsulation of the locking ring E in the gasket D is also advantageous because it prevents dust or dirt, or any harmful chemicals carried by the pipeline from attacking the locking ring.

The function of the locking ring E is to inhibit movement of the gasket D relative to the pipe groove 10 both when the two pipes B, C are first connected and when the pipeline system is in use. When the second pipe C is introduced through the gasket assembly A, the assembly will be deformed and a large twisting movement will occur on the gasket D. The locking ring E counteracts this twisting movement by trapping a portion of the gasket between the ring and the pipe walls so that the gasket is not pushed out of the pipe groove 10.

To some extent, the locking ring E also stiffens the gasket D by insuring that the two lips 20, 22 remain in contact with the inner pipe C even under high pressures or vacuums without interfering with the sealing function or the sealing efficiency of the two lips 20, 22. It should be noted that the plane of the locking ring E is positioned considerably below the plane of the inner pipe C. In other words, the groove 44 is centered with respect to a vertical axis of the gasket D. This, in conjunction with the horizontally central location of the groove 44 and hence of the locking ring E in the gasket D, makes the gasket assembly much more retainable in the pipe bell or groove 10.

To assemble the gasket assembly A, the gasket D is spread apart at the annular opening 42 so that the ring body 48 can be inserted in the groove 44. Thus, the annular opening 42 enables the easy installation and removal of the ring body 48 from the groove 44. Once the locking ring E is in place, the annular opening 42 is closed due to the resiliency of the gasket body 14 and to the weight of the fluid pressure sealing lip 22. This seals the locking ring E against the environment and protects it from blowing dust, dirt or sand, for example, when the ring is stored in an open yard. When the second pipe C is inserted into the first pipe B, the opening 42 is shut even more tightly as the sealing lip 22 is bent back against the gasket body 14 as shown in FIG. 3C.

The gasket is preferably made of a resilient material, such as rubber, although other suitable conventional materials could also be used. Thus, the gasket may be made of any suitable elastomer which is moisture-proof, resilient and firm yet stretchable, for example, a material having a duromater value of approximately 50 to 70.

The locking or retaining ring may be manufactured of any material which is harder than the gasket, although it is generally made of a plastic material. Suitable hard plastic materials for such purpose include nylon, polypropylene and polyvinylchloride.

Figure 3A:
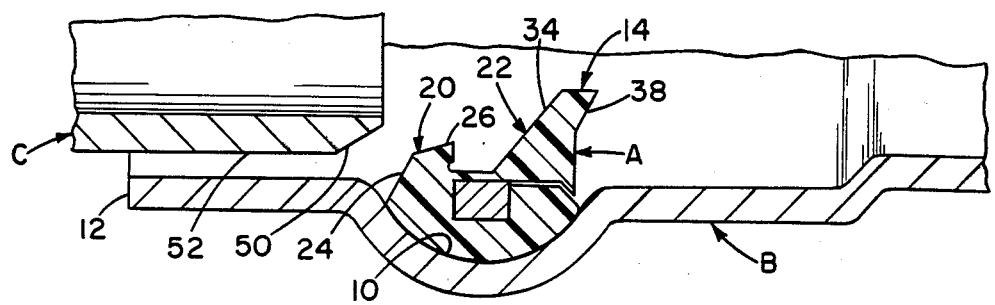
Figure 3B:
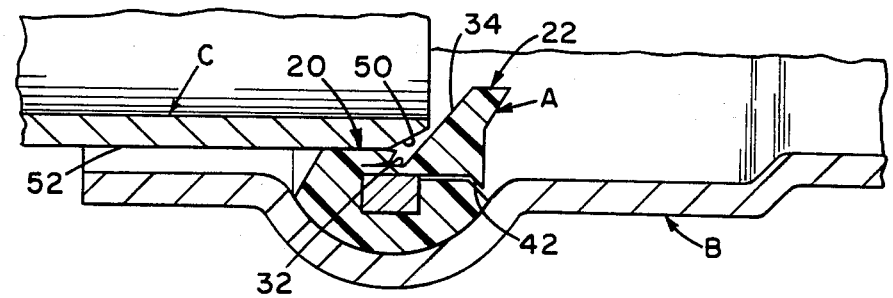
Figure 3C:
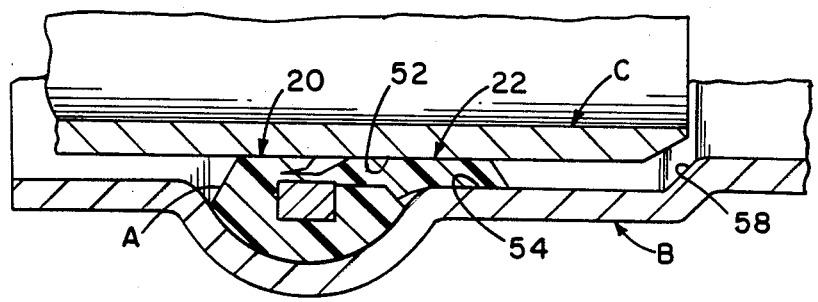

With reference now to FIGS. 3A through 3C the process of insertion of the second pipe C into the first pipe B is shown. With particular reference now to FIG. 3A, it can be seen that the gasket assembly A is positioned in the pipe groove 10 of the first pipe B. The second pipe C is inserted in the first pipe B through its opening 12. As the second pipe C travels down the first pipe B, a forward face 50 of the second pipe contacts the gasket assembly A.

As mentioned, the gasket leading lip forward face 24 has a conical-shape and serves to center the second pipe C in the first pipe B. Also dirt, grime, burrs, shavings, or other foreign matter are wiped off the forward face 50 and an outer periphery or surface 52 of the inner pipe C by the gasket forward face 24 to provide a clean sealing surface.

With reference now to FIG. 3B, the forward face 50 of the second pipe C contacts the top face 26 of the gasket body 14. The gasket leading lip 20 is thus bent back and compressed downwardly against the gasket body 14 and extends partially over the flat portion 32. The top face 26 serves to provide a compression seal against the second pipe outer surface 52. This seal is used to prevent infiltration of air or other fluids or dirt, etc. when a vacuum is pulled on the pipeline. In other words, the functon of the top face 26 is to prevent fluids or solids outside the pipeline from entering it when the pipeline undergoes a temporary vacuum condition as, for example, when a fire main is opened. The top face 26 is also conically shaped as is the forward face 24, but at a much shallower angle.

Since the second pipe outer periphery 52 contacts a radially inner portion of the forward face 24 so that the pipe can be centered and wiped thereby, it is evident that the pipe will tend to push outwardy against the top face 26 which is located radially inwardly of the forward face. Thus, the entire top face 26 is pushed outwardly as the second pipe C enters the gasket D. In this way, an intimate contact with the leading lip top face 26 is assured and the top face can thus provide a compression seal against the pipe.

With reference now to FIG. 3C, as the second pipe C travels further into the first pipe B, it encounters the forward face 34 of the pressure actuated sealing lip 22 which is subsequently bent back and pushed downwardly and backwardly against the first pipe B. A portion of the inclined rear face 38 contacts an inner surface 54 of the first pipe B when the sealing lip is fully compressed. As this compression takes place, the annular opening 42, provided in the gasket body 14, is forced shut even more to insure that the locking ring E cannot communicate with its environment but is, instead, totally enclosed or encapsulated within the gasket body 14. (The annular opening 42 is shown as being somewhat open in FIGS. 3A and 3B merely for the sake of clarity but is, in reality, already closed at that point.)

The pressure actuated sealing lip 22 is meant to provide a fluid pressure actuated seal between the two pipes B, C. This seal is activated by the fluid pressure in the pipeline and is meant to prevent the outward seepage of pressurized fluid from between the pipe sections B, C. If, on the other hand, a vacuum were suddenly pulled on the pipeline, this seal 22 may not be effective in preventing the inward seepage of fluids into the pipeline. That is the function of the compression seal provided by the leading lip top face 26. The latter, in turn, could not prevent the outward seepage of pressurized fluid from the pipeline. Thus, as can be seen, the gasket assembly of the present invention provides pipe centering and cleaning face 24 and a compression sealing face 26 on a leading lip 20, as well as a pressure actuated sealing lip 22. In other words, two separate, spaced apart seals are provided between the two pipes B, C, a compression seal and a pressure actuated seal, to provide for complete sealing between pipe sections even in high pressure pipelines.

The second pipe C extends into the first pipe B approximately as far as an indented portion 58 of the first pipe. This indented portion 58, as well as the groove or bell 10 in the first pipe B, may be formed in a conventional bell and spigot making machine.

It should be noted that if it is not necessary for the gasket assembly to withstand the 250 psi pressure found in CIPS-type pipelines, the locking or reinforcing ring E can be eliminated. In this connection, the gasket A could be alternatively designed as a solid piece without the groove for the locking ring. Such a design would be suitable for a gasket which needs to withstand the lower pressures found in sewer pipes (20 psi) and PIP-type pipes (50 psi). Naturally, this would be a much simpler design, and hence considerably less expensive. The design would nevertheless keep the advantages of having a leading lip with a separate centering and cleaning face and a compression sealing face positioned rearwardly and radially inwardly thereof as well as a spaced apart pressure actuated sealing lip.

The subject invention thus provides for a gasket assembly which gives a thorough seal in a pipeline joint even under high pressure conditions since the gasket locking ring is retained within an enclosed groove in the gasket and has no tendency to twist-out. Also, the locking ring is not exposed to dust, dirt or other environmental hazards either during storage or in use because of its complete encapsulation. Moreover, th gasket assembly of the present invention also provides for a pipe centering and cleaning face, and a separate compression sealing face on a leading lip, as well as a pressure actuated sealing lip spaced therefrom.

The invention has been described with reference to a preferred embodiment. Obviously, modifications and alterations will occur to others upon the reading and understanding of this specification. It is intended to include all such modifications and alterations insofar as they come within the scope of the appended claims or the equivalents thereof.

Having thus described a preferred embodiment of the invention, it is now claimed:

1. A gasket assembly suitable for high pressure applications such as fire hydrants, water mains and the like, comprising:
   an annular gasket body made of a resilient material, said body having an inner surface provided with a leading lip and a pressure actuated sealing lip spaced rearwardly therefrom, said leading lip including:
   a conical pipe centering and cleaning face disposed at a first angle with respect to the longitudinal plane of said gasket body, and
   a conical compression sealing face disposed at a second angle with respect to said longitudinal plane, said second angle being smaller than said first angle,
   an enclosed annular groove provided in a central portion of said gasket body; and,
   an annular locking ring selectively insertable in said annular groove, said locking ring being made of a material harder than said gasket body.

2. The gasket assembly of claim 1 wherein said gasket body leading lip centering and cleaning face is located adjacent said compression sealing face and wherein said compression sealing face is located radially inwardly of said centering and cleaning face.

3. The gasket assembly of claim 1 wherein said gasket body has a substantially convex outer face.

4. The gasket assembly of claim 3 further comprising an annular opening leading from a rear face of said gasket body to said groove to allow for selective insertion and removal of said annular ring from said groove.

5. The gasket assembly of claim 1 wherein said groove is rectangular in cross section and wherein said ring is also rectangular in cross section.

6. The gasket assembly of claim 4 wherein said annular opening is closed when the gasket assembly is positioned in a groove of an associated pipe.

7. The gasket assembly of claim 1 wherein said annular groove is centrally located between said leading lip and said pressure actuated sealing lip and said groove is centrally positioned in said gasket body.

8. The gasket assembly of claim 1 wherein said pressure actuated sealing lip extends further radially inwardly than said leading lip.

9. The gasket assembly of claim 1 wherein said gasket body annular groove is provided with annular surfaces which engage said locking ring as an associated inner pipe is being inserted into an associated outer pipe, said locking ring providing radial force to said gasket body whereby said gasket body is maintained in an annular groove of said associated outer pipe.

10. The gasket assembly of claim 9 wherein said associated inner and outer pipes are of the bell and spigot type.

11. The gasket assembly of claim 1 wherein said annular groove is centrally located between said leading lip and said pressure actuated sealing lip and said groove is also centrally positioned with respect to a vertical axis of said gasket body.

12. The gasket assembly of claim 1 wherein said gasket assembly is designed to withstand pressures of up to 250 psi as well as temporary partial vacuums such as those experienced in fire hydrants and water mains.

* * * * *